(12) United States Patent
Guillez

(10) Patent No.: US 6,848,736 B2
(45) Date of Patent: Feb. 1, 2005

(54) RETRACTABLE ROOF FOR A VEHICLE, HAVING A DEVICE FOR OPTIMISING THE PLACING OF LUGGAGE IN THE BOOT

(75) Inventor: Jean-Marc Guillez, Cirieres (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/467,290

(22) PCT Filed: Dec. 4, 2001

(86) PCT No.: PCT/EP01/14113
§ 371 (c)(1),
(2), (4) Date: Aug. 5, 2003

(87) PCT Pub. No.: WO02/062605
PCT Pub. Date: Aug. 15, 2002

(65) Prior Publication Data
US 2004/0061352 A1 Apr. 1, 2004

(30) Foreign Application Priority Data
Feb. 5, 2001 (FR) .............................. 01 01507

(51) Int. Cl.⁷ .................................................. B60J 7/14
(52) U.S. Cl. .............. 296/107.08; 296/108; 296/107.18
(58) Field of Search ............................ 296/107.08, 108, 296/107.18

(56) References Cited
U.S. PATENT DOCUMENTS
6,595,572 B2 * 7/2003 Schuler et al. ......... 296/107.08

FOREIGN PATENT DOCUMENTS
EP                101322        * 8/1983

* cited by examiner

Primary Examiner—Dennis H. Pedder
(74) Attorney, Agent, or Firm—Nawrocki, Rooney & Sivertson, P.A.

(57) ABSTRACT

The retractable roof comprises several rigid roof elements (1, 2, 3) able to move between a position in which they cover the passenger compartment of the vehicle and a position in which they are stored inside the rear boot (4) of the vehicle, so as to be superimposed substantially horizontally under the lid (5) of the rear boot (4).

The assembly consisting of the roof elements (1, 2, 3), stored inside the rear boot (4), is mounted so as to pivot on an axis (6) situated within the boot (4), so that it is possible to raise this assembly upwards during or after the opening of the lid (5) of the boot (4) from rear to front.

9 Claims, 1 Drawing Sheet

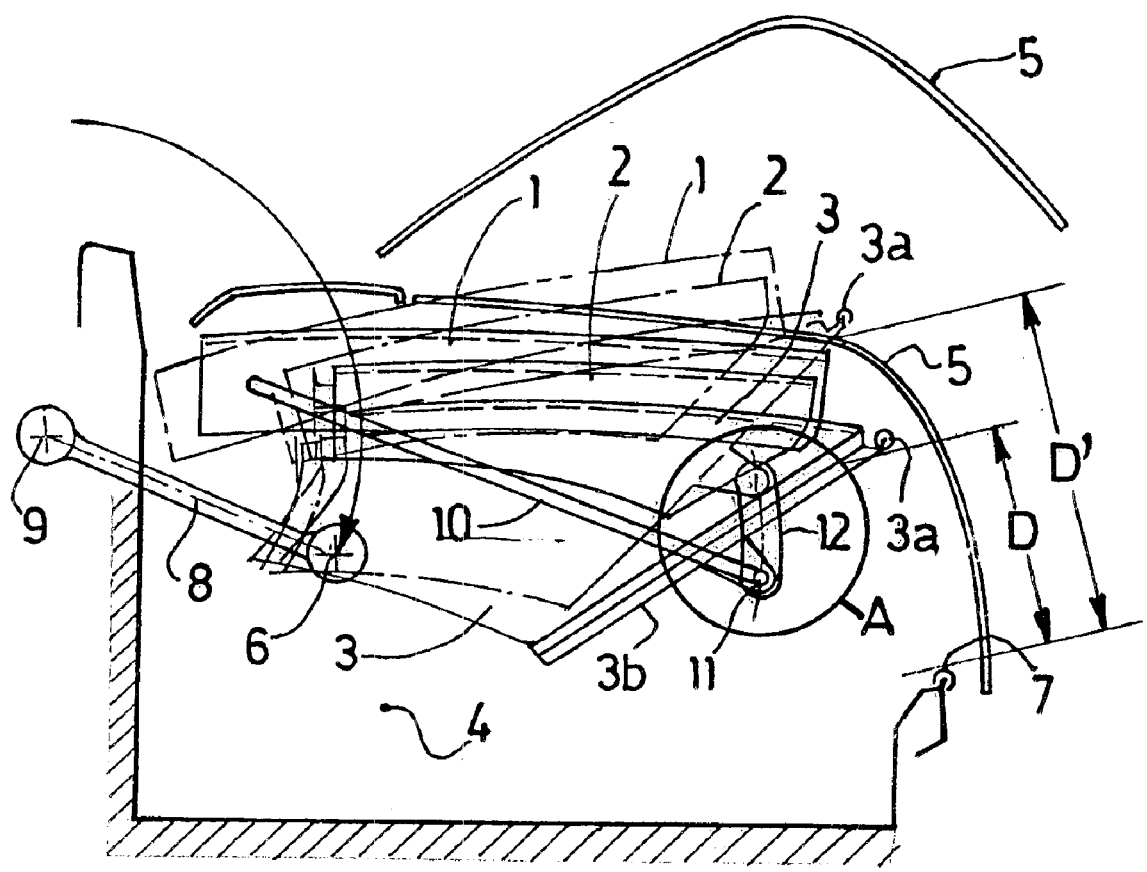

RETRACTABLE ROOF FOR A VEHICLE, HAVING A DEVICE FOR OPTIMISING THE PLACING OF LUGGAGE IN THE BOOT

The invention relates to a retractable roof for vehicles comprising several rigid roof elements able to move between a position in which they cover the passenger compartment of the vehicle and a position in which they are stored in the rear boot of the vehicle.

Such a retractable roof makes it possible to convert a vehicle of the saloon or coupé type into a vehicle of the cabriolet type.

In many designs, the roof elements, when they are stored inside the rear boot of the vehicle, are placed one on top of the other and extend substantially horizontally under the boot lid.

In this position, there remains inside the boot, under the superimposed roof elements, a space for housing luggage.

However, the threshold for access inside the boot, that is to say the distance between the rear edge of the bottom roof element and the rear edge of the access opening to the boot, is limited, which impedes the placing of the luggage inside the boot.

The aim of the present invention is to remedy the above drawback by creating a device for increasing the distance between the rear edge of the boot opening and the rear edge of the bottom roof element in order to facilitate the placing of the luggage inside the boot.

The invention thus relates to a retractable roof for a vehicle, comprising several rigid roof elements able to move between a position in which they cover the passenger compartment of the vehicle and a position in which they are stored inside the rear boot of the vehicle, so as to be superimposed substantially horizontally under the rear boot lid.

According to the invention, this retractable roof is characterised in that the assembly consisting of the roof elements, stored inside the rear boot, is mounted so as to pivot on an axis situated within the boot, so that this assembly can be raised upwards during or after the opening of the boot lid from rear to front.

By virtue of this possibility of being able to raise the roof element assembly by pivoting about the aforementioned axis, the distance between the rear edge of the boot opening and the rear edge of the bottom roof element is increased.

This arrangement thus facilitates the placing of luggage inside the boot.

In a preferred version of the invention, the retractable roof comprises a rear element, a front element and possibly an intermediate element, the movement of this assembly towards the boot being controlled by a pivoting arm articulated at a fixed point on the bodywork and at a point situated close to the front of the rear element, the latter being situated under the front element and possibly under the intermediate element, when these are stored in the rear boot.

In this embodiment the assembly of roof elements stored inside the boot is mounted so as to pivot about the point of articulation of the said arm situated close to the front of the rear element.

In the above version the movement of the rear element towards the boot is also guided by a runner extending inside the boot, in which there is engaged a finger fixed to the rear of the rear element.

In this embodiment, the said finger is connected to the rear part of the rear element by means making it possible, when the finger is in the end of travel position in the said runner, to space the rear part of the rear element apart from the said finger.

Preferably the finger is fixed to a lug directed towards the rear of the rear element and having a groove in which there is slidably engaged at least one finger carried by a fixed lug at the rear part of the rear element.

This arrangement makes it possible to guide the movement of the assembly consisting of the superimposed roof elements during their raising.

Other particularities and advantages of the invention will emerge below.

In the accompanying drawings given by way of non-limitative examples:

FIG. 1 is a schematic view in longitudinal section of the boot of a vehicle in which there are stored the elements of a retractable roof according to the invention;

FIG. 2 is an enlarged view of detail A in FIG. 1;

FIG. 3 is a view in section along the plane III—III in FIG. 2.

The retractable roof shown in FIG. 1 comprises three rigid roof elements 1, 2, 3 able to move between a position in which they cover the passenger compartment of the vehicle and a position (the one shown in FIG. 1) in which they are stored inside the rear boot 4 of the vehicle, in a superimposed fashion, substantially horizontally and under the lid 5 of the rear boot 4.

According to the invention, the assembly consisting of the roof elements 1, 2, 3 stored inside the rear boot 4 is mounted so as to pivot on an axis 6 situated inside the boot 4, so that it is possible to raise this assembly upwards during and after the opening of the lid 5 of the boot from rear to front.

When the assembly consisting of the elements 1, 2, 3 is in the raised position, the distance between the rear edge 7 of the opening of the boot 4 and the rear edge 3a of the bottom element 3 changes from a value D to a value D', which facilitates the placing of the luggage inside the boot 4.

In the example depicted in FIG. 1, the retractable roof comprises a rear element 3, a front element 1 and an intermediate element 2. The movement of this assembly towards the boot 4 is controlled by a pivoting arm 8 articulated at a fixed point 9 on the bodywork and at a point 6 situated close to the front of the rear element 3. The latter is situated under the front element 1 and under the intermediate element 2, when these are stored in the rear boot.

The assembly consisting of the roof elements 1, 2, 3 stored inside the boot 4 is mounted so as to pivot about the point of articulation 6 of the arm 8 situated close to the front of the rear element 3.

The movement of the rear element 3 towards the boot 4 is also guided by a runner 10 extending inside the boot 4. In this runner 10 there is engaged a finger or roller 11 (see FIGS. 2 and 3) fixed to the rear 3b of the rear element 3.

The roller 11 is connected to the rear part 3b of the rear element 3 by means making it possible, when the roller 11 is in the end of travel position in the runner 10, to space the rear part 3b of the rear element 3 apart from the roller 11, as shown by FIGS. 2 and 3.

In the example depicted the roller 11 is fixed to a lug 12 directed towards the rear 3b of the rear element 3, and which has a groove 13 in which there are slidably engaged two fingers 14 carried by a lug 15 fixed to the rear part 3b of the rear element 3.

FIG. 3 shows that the spacing of the rear part 3b of the rear element 3 with respect to the roller 11 engaged in the runner 10 is controlled by means of a ram 16 whose body 16a is connected to the lug 12 carrying the roller 11 and the rod 16b is connected to the lug 15 fixed to the rear element 3.

Preferably the actuation of the ram 16 is effected simultaneously with the actuation of the opening of the lid 5 of the boot 4.

The actuation of the ram 16 pushes the rear part 3b of the rear element 3 upwards, this movement being guided by the sliding of the fingers 14 in the groove 13 formed in the lug 12.

By virtue of the raising of the assembly consisting of the elements 1, 2, 3 by pivoting about the axis 6, the distance D between the rear edge 7 of the opening of the boot and the rear edge 3a of the rear element 3 changes to D'.

The increase in this distance facilitates the placing of the luggage inside the vehicle boot.

Naturally, the raising of the assembly consisting of the elements 1, 2, 3 could be controlled manually, for example by means of a handle fixed to the rear of the rear element 3 or by an appropriate connection between this element 3 and the lid 5, so that the manual or motorised opening of the lid 5 simultaneously controls the lifting of the assembly consisting of the elements 1, 2, 3.

What is claimed is:

1. A retractable roof for a vehicle, comprising several rigid roof elements able to move between a position in which they cover the passenger compartment of the vehicle and a position in which they are stored inside the rear boot of the vehicle, so as to be superimposed substantially horizontally under the lid of the rear boot, characterised in that the assembly consisting of the roof elements, stored inside the rear boot, is mounted so as to pivot on an axis situated inside the boot, so that it is possible to raise this assembly upwards during or after the opening of the lid of the boot from rear to front, retractable roof comprising a rear element, a front element and an intermediate element, the movement of this assembly towards the boot being controlled by a pivoting arm articulated at a fixed point on the bodywork and at a point situated close to the front of the rear element, the latter being situated under the front element and under the intermediate element, when these are stored in the rear boot, characterised in that the assembly consisting of the roof elements stored inside the boot is mounted so as to pivot about the point of articulation of the said arm situated close to the front of the rear element.

2. A retractable roof for a vehicle, comprising several rigid roof elements able to move between a position in which they cover the passenger compartment of the vehicle and a position in which they are stored inside the rear boot of the vehicle, so as to be superimposed substantially horizontally under the lid of the rear boot, characterised in that the assembly consisting of the roof elements, stored inside the rear boot, is mounted so as to pivot on an axis situated inside the boot, so that it is possible to raise this assembly upwards during or after the opening of the lid of the boot from rear to front, the retractable roof, comprising a rear element, a front element and an intermediate element, the movement of this assembly towards the boot being controlled by a pivoting arm articulated at a fixed point on the bodywork and at a point situated close to the front of the rear element, the latter being situated under the front element and under the intermediate element, when these are stored in the rear boot, characterised in that the assembly consisting of the roof elements stored inside the boot is mounted so as to pivot about the point of articulation of the said arm situated close to the front of the rear element, the movement of the rear element towards the boot also being guided by a runner extending inside the boot, in which there is engaged a finger fixed to the rear of the rear element, characterised in that the said finger is connected to the rear part of the rear element by means making it possible, when the finger is in the end of travel position in the said runner to space the rear part of the rear element apart from the said finger.

3. A retractable roof according to claim 2, characterised in that the finger (11) is fixed to a lug (12) directed towards the rear of the rear element (3) and having a groove (13) in which there is slidably engaged at least one finger (14) carried by a lug (15) fixed to the rear part (3b) of the rear element (3).

4. A retractable roof according to claim 2, characterised in that the spacing of the rear part (3b) of the rear element (3) with respect to the finger (11) engaged in the runner (10) is controlled by means of a ram (16).

5. A retractable roof according to claim 4, characterised in that the actuation of the said ram (16) is effected simultaneously with the opening of the lid (5) of the boot (4).

6. A retractable roof for a vehicle, comprising two rigid roof elements able to move between a position in which they cover the passenger compartment of the vehicle and a position in which they are stored inside the rear boot of the vehicle, so as to be superimposed substantially horizontally under the lid of the rear boot, characterised in that the assembly consisting of the two roof elements, stored inside the rear boot, are mounted so as to pivot on an axis situated inside the boot, so that it is possible to raise this assembly upwards during or after the opening of the lid of the boot from rear to front, and further comprising a rear element and a front element, the movement of this assembly towards the boot being controlled by a pivoting arm articulated at a fixed point on the bodywork and at a point situated close to the front of the rear element, the latter being situated under the front element, when these are stored in the rear boot, characterised in that the assembly consisting of the two roof elements stored inside the boot are mounted so as to pivot about the point of articulation of the said arm situated close to the front of the rear element, the movement of the rear element towards the boot also being guided by a runner extending inside the boot, in which there is engaged a finger fixed to the rear of the rear element, characterised in that the said finger is connected to the rear part of the rear element by means making it possible, when the finger is in the end of travel position in the said runner to space the rear part of the rear element apart from the said finger.

7. A retractable roof according to claim 6, characterised in that the finger is fixed to a lug directed towards the rear of the rear element and has a groove in which there is slidably engaged at least one finger carried by a lug fixed to the rear part of the rear element.

8. A retractable roof according to claim 6, characterised in that the spacing of the rear part of the rear element with respect to the finger engaged in the runner is controlled by means of a ram.

9. A retractable roof according to claim 8, characterised in that the actuation of the said ram is effected simultaneously with the opening of the lid of the boot.

* * * * *